(12) United States Patent
Solis et al.

(10) Patent No.: US 9,099,887 B2
(45) Date of Patent: Aug. 4, 2015

(54) COMMON MONITORING AND/OR CONTROL OF A FLYWHEEL AND BATTERY-BASED POWER SUPPLY SYSTEM

(75) Inventors: Octavio Solis, Pico Rivera, CA (US); Oliver Ulibas, Anaheim Hills, CA (US)

(73) Assignee: Vycon, Inc., Cerritos, CA (US)

( * ) Notice: Subject to any disclaimer, the term of this patent is extended or adjusted under 35 U.S.C. 154(b) by 837 days.

(21) Appl. No.: 13/178,195

(22) Filed: Jul. 7, 2011

(65) Prior Publication Data

US 2013/0009476 A1    Jan. 10, 2013

(51) Int. Cl.
*H02J 1/12* (2006.01)
*H02J 3/00* (2006.01)
*H02J 9/06* (2006.01)

(52) U.S. Cl.
CPC ...................... *H02J 9/062* (2013.01)

(58) Field of Classification Search
CPC ...................... H02J 3/30; H02J 3/32
USPC ...................................... 307/66, 46
See application file for complete search history.

(56) References Cited

U.S. PATENT DOCUMENTS

| | | | |
|---|---|---|---|
| 5,384,792 A | 1/1995 | Hirachi | |
| 5,994,794 A | 11/1999 | Wehrlen | |
| 6,304,006 B1 | 10/2001 | Jungreis | |
| 6,486,627 B1 | 11/2002 | Gabrys | |
| 6,657,320 B1 | 12/2003 | Andrews et al. | |
| 7,633,172 B2 | 12/2009 | Kalev et al. | |
| 7,855,465 B2 | 12/2010 | Kalev et al. | |
| 2003/0160514 A1* | 8/2003 | Rajagopalan | 307/65 |
| 2004/0207266 A1 | 10/2004 | Abel et al. | |
| 2005/0077881 A1* | 4/2005 | Capp et al. | 322/29 |
| 2006/0066163 A1* | 3/2006 | Melfi | 310/74 |
| 2011/0238250 A1* | 9/2011 | Takao | 701/22 |

* cited by examiner

*Primary Examiner* — Rexford Barnie
*Assistant Examiner* — Toan Vu
(74) *Attorney, Agent, or Firm* — Fish & Richardson P.C.

(57) ABSTRACT

A power supply system includes a flywheel system electrically coupled to a DC bus for supplying electrical power between a power grid and a load. The flywheel system includes a flywheel coupled to rotate with a rotor of a motor/generator. A battery system is electrically coupled to the DC bus concurrently with the flywheel system.

21 Claims, 3 Drawing Sheets

COMMON MONITORING AND/OR CONTROL OF A FLYWHEEL AND BATTERY-BASED POWER SUPPLY SYSTEM

BACKGROUND

This document relates to power supply systems.

An uninterruptible power supply (UPS) system can be implemented to ensure constant power supply to a load even when an input power source fails. To accommodate the power requirement of certain loads, such as loads with high power requirements, a UPS system with a flywheel system can be employed. The flywheel system interfaces with the input power source, or power grid (e.g., a plant wide, citywide, statewide and/or nationwide utilities power transmission grid), and the load. When the power to the load falls below a threshold, for example, when the power grid fails, the flywheel system can discharge the stored energy, which, in turn, can be used to power the load.

As an alternative to the flywheel system, a battery system that includes multiple batteries can be used. The battery system interfaces with the power grid to store energy when the power grid delivers power to the load, and to discharge the energy to the load, for example, when the power grid fails. Each of the flywheel system and the battery system can be configured to deliver back-up power when the power source fails such that the load does not experience a power interruption. In addition, each of the systems can deliver back-up power for a duration sufficient to start back-up generators. In some situations, the flywheel system, the battery system, the power source, and the load can all be components of the same circuit.

SUMMARY

This document relates to power supply systems.

In certain aspects, a load is powered by power from an alternating current (AC) power source. A power supply system for supplying back-up power to the load includes a flywheel system. The flywheel system includes a flywheel and an AC motor/generator electrically coupled to a direct current (DC) bus. The flywheel system is configured to store, as kinetic energy, power received from the power source and, when power to the load from the power source decreases below a specified threshold, to provide power to the load through the DC bus. A battery system is also electrically coupled to the DC bus. The battery system is configured to remain electrically coupled to the DC bus while the flywheel system is providing power to the load and is configured to store power received from the power source and to provide power to the load. A controller is coupled to the flywheel system and the battery system. The controller is configured to monitor the flywheel system and the battery system.

In certain aspects AC power is supplied from a flywheel system, rectified, to a DC bus while a battery system is electrically coupled to the DC bus. The DC bus is used in supplying power from the flywheel system to the load. DC power is supplied from the battery system to the DC bus. The flywheel system and the battery system are monitored with a common controller.

In certain aspects, a power supply system includes a flywheel system. The flywheel system includes a flywheel and a motor/generator electrically coupled to a DC bus to provide power to the DC bus. The DC bus is coupled to for supplying electrical power to a load. A battery system is electrically coupled to the DC bus to supply power to the DC bus. The battery system is configured to remain electrically coupled to the DC bus while the flywheel system is providing power to the DC bus. A controller is coupled to the flywheel system and the battery system to monitor the flywheel system and the battery system.

Particular implementations of the subject matter described in this specification can be implemented so as to realize one or more of the following advantages. A power supply system that includes a flywheel system and a battery system can be combined with integrated control from the flywheel system. Such a fully integrated energy storage system can be controlled through a controller connected to the flywheel system. The flywheel system can be configured to provide initial support for critical loads. The battery system can subsequently seamlessly transition to provide back-up power for extended run-times. Such integration can minimize or eliminate the "coup de fouet" phenomenon, which can result in extended battery lives.

Using the controller, the usage of the flywheel system and the battery system can be monitored to determine status and battery life. The monitored information which describes the complete power supply system, and provides insight to users into availability or any other issues, can be presented in a single interface. Further, the battery system can be designed to provide support for reduced run times (for example, less than five minutes, more particularly between 15 seconds and two minutes), which can result in reduced footprint, smaller sized batteries and extended battery life. For example, the run time of the flywheel system is first to support critical loads while the battery system can be used for those rare occurrences where extended runtime is required. The run times of the combined flywheel system and the battery system can be short in comparison to standard practices, yet adequate for multiple back-up generators to start in sequence rather than simultaneously.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1A:
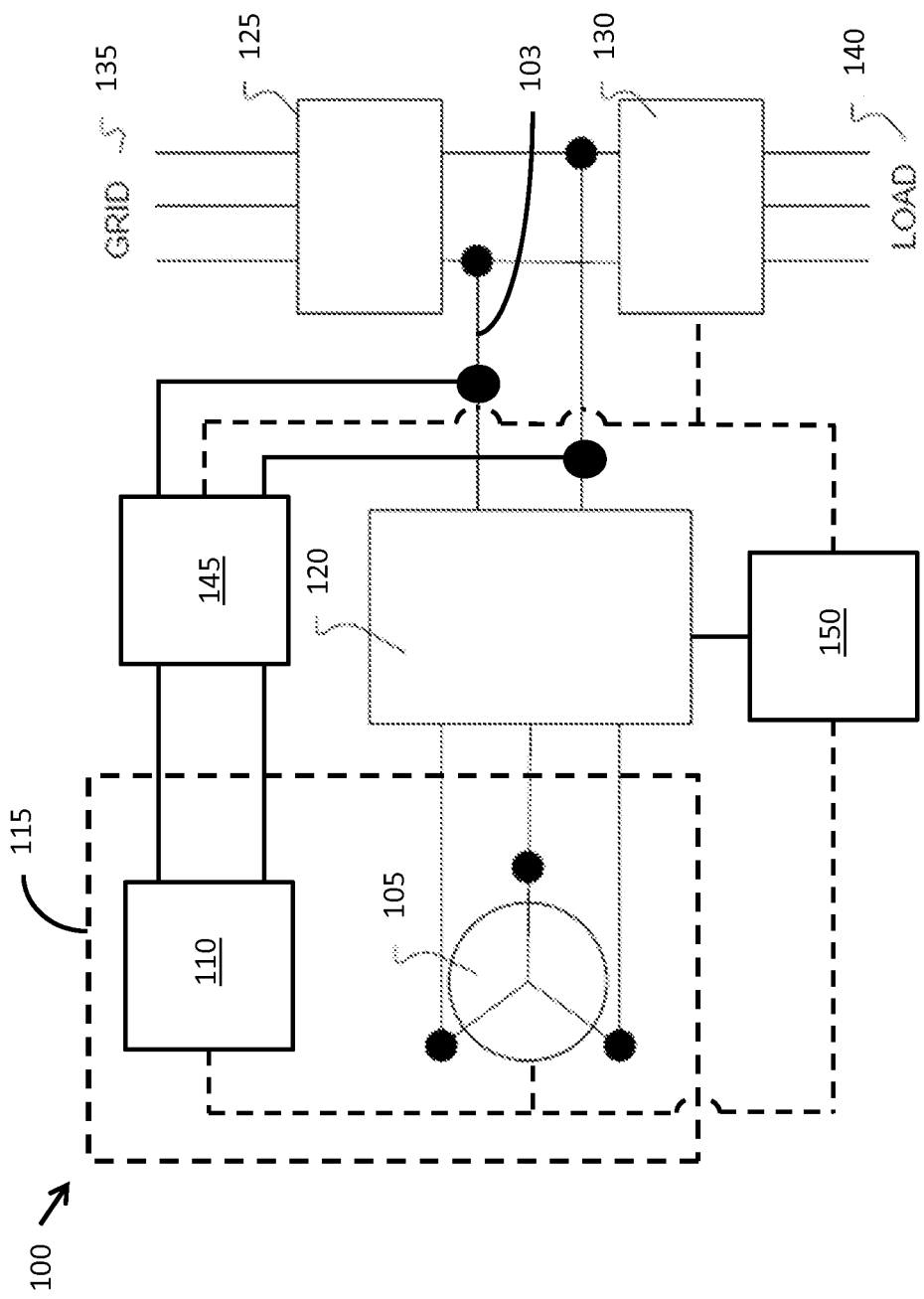
FIG. 1A is a diagram of components used in a power supply system.

FIG. 1A depicts an example configuration 100 of components used in a power supply system that includes a flywheel system 105 and a battery system 110 interfaced with a direct current (DC) bus 103 of a dual conversion UPS system. The power supply system is an example of a back-up UPS system that provides ride-through power to a load 140 for a duration between when utility power, for example, from a power grid 135, goes off-line and the backup generators are starting. In certain instances, the flywheel system 105 illustrated in FIG. 1A can be a motor/generator system described below with reference to FIG. 2. In some implementations, the flywheel system 105 and the battery system 110 can be housed in a single housing 115. Alternatively, the flywheel system 105 and the battery system 110 can be housed in respective housings and can be electrically and mechanically connected to each other. In the power supply system illustrated in FIG. 1A, the flywheel system 105 and the battery system 110 are each coupled to the DC bus 103 such that the load receives back-up power from one of the systems followed by the other, the transition between the two systems being seamless. As shown, the battery system 110 can interface directly with the DC bus 103 without a switching circuit to switch the battery system 110 in or out of the circuit.

As described below with reference to FIG. 2, the flywheel system 105 can be configured to store kinetic energy in the form of a rotating mass accelerated to a very high speed, which is then extracted as electrical energy as the flywheel slows down during a discharge phase. The battery system 110 can include multiple trays of batteries (for example, four trays, or fewer or more trays), with each tray including multiple batteries (for example, ten batteries, or fewer or more batteries). Both the flywheel system 105 and the battery system 110 are configured to receive power from a power grid 135 and to provide back-up power to a load 140 so that the load 140 does not experience any significant power decrease or interruption. The power grid 135 is connected to and provides power to the load 140. When the power from the power grid 135 decreases below a threshold (for example, the power is interrupted or drops below a threshold voltage or one phase fails), the flywheel system 105 can provide power to the load through the DC bus 103 without interruption. As described below, the flywheel system 105 can provide the power to the load as it spins down, and then the battery system 110 provides the power instead of the flywheel system 105.

The flywheel system 105 and the battery system 110 can interface with the DC bus 103 in parallel with each other. The flywheel system 105 can be configured and rated (for example, a voltage rating) to produce a voltage that is higher than a corresponding rating of the battery system 110 or that the battery system 110 is configured to supply, and that is lower than that of the DC voltage produced by the rectified power grid 135. For example, for a power grid 135 that produces a rectified DC voltage of 540V, the flywheel system 105 and the battery system 110 can have a voltage rating of 520V and 480V, respectively. When the rectified DC voltage of the power grid 135 drops below 520V, the flywheel system 105 provides power to the load. As rotational energy dissipates from the flywheel of the flywheel system 105, the voltage output from the flywheel system 105 decreases. After a certain duration, the voltage output of the flywheel system 105 decreases to the voltage of battery system 110. For example, the voltage output of the flywheel system 105, which was initially 520V drops to 480V as the flywheel system 105 discharges stored energy over time. At that time, the battery system 110 begins to provide power to the load 140, and the flywheel system 105 ceases to provide power to the load 140. The battery system 110 can continue to provide power to the load 140 while, for example, the back-up generators start up and bring the voltage to the load 140 above rectified DC voltage of 480V, at which time the battery system 110 can cease providing power to the load 140.

In the manner described above, the flywheel system 105 hands-off the task of providing power to the load 140 when the voltage output by the flywheel system 105 decreases to below that of the battery system 110. The voltage output by each of the flywheel system 105 and the battery system 110 can be configured to control a duration for which the flywheel system 105 provides power to the load 140 and to control a time at which the battery system 110 begins to provide power instead of the flywheel system 105. The seamless hand-off from the flywheel system 105 to the battery system 110 occurs because the battery system 110 is interfaced directly with the DC bus 103. Specifically, the battery system 110 interfaces with the DC bus 103 without a switching circuit. Consequently, when the voltage output by the flywheel system 105 decreases to below that of the battery system 110, the latter need not be switched into the circuit to provide power to the load 140. Instead, the battery system 105 automatically begins to provide power.

The circuit shown in FIG. 1A can include multiple additional components. In some implementations, a passive rectifier 125 converts incoming alternating current (AC) from a power source, such as the power grid 135, into direct current. In some implementations, an active bi-directional converter 120 is used to convert the direct current from the passive rectifier 125 back into alternating current to power the motor/generator of the flywheel system 105. The conversion from AC power to DC power and back to AC power enables control of the power provided to the flywheel system 105, for example, to enable control the speed of the flywheel.

The operation of the flywheel system 105 stores energy via rotation of a flywheel. If power is needed from the flywheel system 105 to supply to the load 140, such as during failure of the power grid 135 and/or poor power from the power grid 135, the flywheel system 105 is used as a generator, and the rotational energy stored by the flywheel system 105 discharges as alternating current via a generator in the flywheel 105. The alternating current from the flywheel system 105 is converted to direct current by the active bi-directional converter 120, and then back into alternating current by an active inverter 130 to power the load 140. As described above, when the voltage output by the flywheel system 105 decreases to that of the battery system 110, the battery system 110 provides direct current instead of the flywheel system 105. In that situation, the direct current from the battery system 110 is converted into alternating current by the active inverter 130 to power the load 140.

Figure 1C:
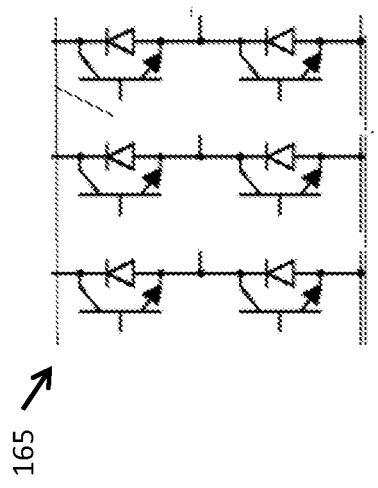
FIGS. 1B and 1C are a circuit diagram of power electronic components used to implement the components described in FIG. 1A.
Figure 1B:
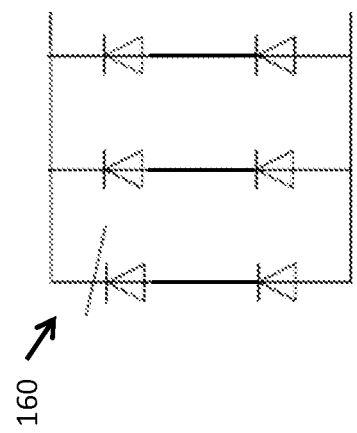

The conversion of alternating current to direct current, and then back into alternating current, as described above, ensures that the output power meets the power requirements of the load 140. Further, different levels of power may be provided by the power grid 135 (for example, load 140, the flywheel system 105, or the battery system 110 during normal operations), depending on the need, without affecting the frequency of the AC output to the load 140. An example of a rectifier circuit 160 that could be used in the passive rectifier 125 and an active inverter 165 circuit that could be used in the active converter 120 and/or active inverter 130, are shown in FIG. 1B and FIG. 1C, respectively. The rectifier can include one or more diodes, and the active inverter can include one or more transistors, for example, insulated gate bi-polar transistors (IGBTs).

In some implementations, charge control circuitry 145 can be interfaced between the battery system 110 and the DC bus 103. The charge control circuitry 145 can include, for example, one or more integrated circuits configured to regulate charging the battery system 110 (e.g., maintain charge, prevent over charging and/or other functions), and to report on the level of charge/discharge of the battery system 110.

A controller 150 can be connected to several components in the circuit (for example, the flywheel system 105, the battery system 110, the bi-directional converter 120, the charge control circuitry 145, the active inverter 130, and the like). The controller 150 can be configured to perform particular operations or actions by virtue of having software, firmware, hardware, or a combination of them installed on the controller 150 that in operation causes the controller 150 to perform actions. The controller 150 can include one or more processors that execute instructions to cause the components to which the controller 150 is connected to perform actions including those described below.

In general, the controller 150 can monitor and provide status indications for the flywheel system 105 and the battery system 110. In some implementations, the controller 150 can either display the status notifications in a user interface displayed in a display device coupled to the controller 105 or transmit the status notifications over one or more networks for display at a remote user interface or both. Within the user interface, the controller can provide information to gain access to the power supply system. A status of the battery system 110 can include battery voltage, temperature, current, open circuit/short, information describing any failed trays in the battery system 110, and the like. A status of the flywheel system 105 can include rotation speed of the flywheel and output voltage of the generator. In some implementations, the controller 150 can generate and provide a waveform having a frequency to the bi-directional converter 120. The frequency of the waveform can be selected to drive the motor of the flywheel system 105 to charge the flywheel (i.e., rotate the flywheel to store energy). In some implementations, the controller 150 can generate and provide a waveform having a frequency to the active inverter 130. The frequency of the waveform can match the frequency of the AC current at which the load 140 operates. The active inverter 130 can then generate AC current with a frequency that matches that of waveform generated by the controller 150. In some implementations, the controller 150 can control the operation of the charge control circuitry 145 to regulate the charge of the battery system 110 that is stored.

As described above, the power supply system is configured such that the flywheel system 105 provides back-up power when power to the load 140 decreases below a threshold (for example, the power grid 135 fails), and then hands-off the task of supplying power to the battery system 110 when an output of the flywheel system 105 decreases to below that of the battery system 110. In some implementations, the flywheel system 105 can provide power to the load for a first duration and the battery system 110 can provide power for a second duration after the first duration. In some situations, a sum of the first and second durations can be two minutes or another duration. Notably, neither the battery system 110 nor the flywheel system 105 need be configured to run the entire duration. In certain instances, in the example of an arrangement providing backup power for two minutes, the flywheel system 105 can be configured to provide power during a first duration of 30 seconds and the battery system 110 can be configured to provide power during the remaining 90 seconds (i.e., the second duration). In certain instances, in an example of an arrangement providing backup power for five minutes, the flywheel system 105 can be configured to provide power during a first duration of 30 seconds and the battery system 110 can be configured to provide power during the remaining 4 minutes and thirty seconds.

Such a configuration allows for a lower capacity battery system 110 than would be required to run the entire duration, and a lower capacity battery system 110 is typically physically smaller and less expensive. Furthermore, for short duration outages, the flywheel system 105 would provide backup power without engaging or minimally engaging the battery system 110. As a result, the arrangement can handle multiple short duration outages and readily recharge. The flywheel system 105 gradually brings the battery system 110 to supply power, and thus reduces and/or minimizes the coup de fouet effect the battery system 110 would otherwise experience if more rapidly called on to provide power. FIG. 2 depicts an example flywheel system 200 used for energy storage in an uninterruptible power supply (UPS) system. The flywheel system 200 can be configured to store kinetic energy in the form of a rotating mass accelerated to a very high speed, which is then extracted as electrical energy as the flywheel slows down during a discharge phase. As illustrated in FIG. 2, the flywheel system 200 includes a flywheel 212 coupled to a rotor 214. The flywheel 212 and the rotor 214 store rotational energy. The flywheel 212 and rotor 214 are contained in a housing unit 216. In some implementations, the housing unit 216 provides a vacuum environment, thus reducing aerodynamic drag on the flywheel 212 and the rotor 214 for increased efficiency of the flywheel system 200.

The rotor 214 can include permanent magnets, and the flywheel system 200 can also include a stator 218 that includes multiple formed or cable windings about a core. The rotor 214 and the stator 218, in combination, comprise parts of a high speed permanent magnet (PM) motor/generator. In certain implementations, magnetic bearings 220 are included in the flywheel system 200 to levitate and sustain the rotor 214 during operation of the flywheel system 200.

The flywheel system 200 includes an alternating current (AC), synchronous, PM electric machine having a rotor 214 that includes permanent magnets and stator 218 that includes multiple formed or cable windings about a core. In other instances, the electric machine can be another type of electric machine, such as an AC, asynchronous, induction machine where both the rotor 214 and the stator 218 include windings or another type of electric machine. The electric machine can operate as a motor producing mechanical movement from electricity, operate as a generator, producing electrical power from mechanical movement, or alternate between generating electrical power and motoring.

Figure 2:
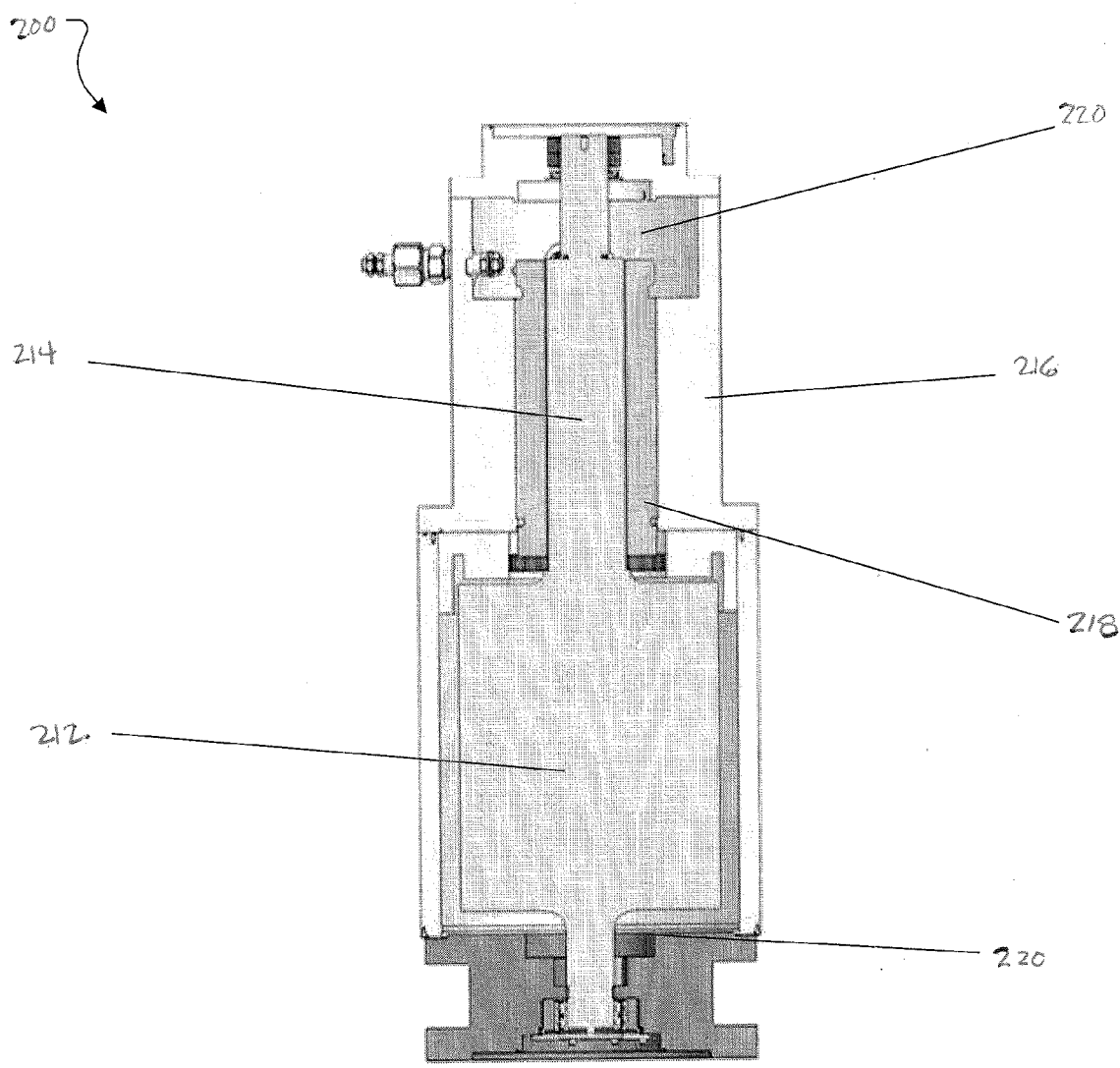
FIG. 2 is a side cross-sectional view of an example flywheel system.

For example, in the flywheel system 200 shown in FIG. 2, the electric machine operates as a motor by drawing electricity from a power source (for example, DC bus 103 via the bi-direction converter 120) to accelerate the rotor 214 and the flywheel 212 to charge, or absorb, rotational energy in the flywheel. During a discharge phase, the electric machine operates as a generator in which the rotational energy of the rotor 214 and flywheel 212 drives the generator, which, in response, creates electricity that is transmitted back into the DC bus 103 for driving other loads 140.

While FIG. 2 illustrates a vertically-oriented flywheel system 200, other implementations can provide for a horizontally-oriented flywheel system coupled to and capable of driving a flywheel 212, as well as yet other orientations of the flywheel system 200.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A power supply system for supplying back-up power to a load, where the load is powered by power from an alternating current (AC) power source, the power supply system comprising:
   a flywheel system comprising a flywheel and an AC motor/generator electrically coupled to a direct current (DC) bus, the flywheel system configured to store, as kinetic energy, power received from the power source and, when power to the load from the power source decreases below a specified threshold, to provide the stored power to the load as electrical power through the DC bus;
   a battery system electrically coupled concurrently with the flywheel system and without a switching circuit to the DC bus, the battery system to receive power from the power source and the battery system configured to remain electrically coupled to the DC bus while the flywheel system is providing power to the load, to store power received from the power source and to provide power to the load through the DC bus; and
   a controller coupled to the flywheel system and the battery system, the controller configured to monitor the flywheel system and the battery system.

2. The power supply system of claim 1, where the controller is configured to provide status indications for the flywheel system and the battery system.

3. The power supply system of claim 1, where in monitoring the battery system, the controller is configured to monitor at least one of battery voltage, temperature, current, and for presence of an open circuit.

4. The power supply system of claim 1, where in monitoring the flywheel system, the controller is configured to monitor at least one of rotational speed and voltage output.

5. The power supply system of claim 1, where the flywheel system is configured to initially output electrical power at a voltage that is greater than the battery system is configured to initially output, and where the voltage output from the flywheel system decreases as the flywheel system provides power to the load.

6. The power supply system of claim 5, where the battery system is configured to provide power to the load when the voltage of the power output by the flywheel system decreases to below the initial voltage of the power output by the battery system.

7. The power supply system of claim 1, where the motor/generator comprises a rotor having permanent magnets.

8. The power supply system of claim 1, where the flywheel is coupled to rotate at the same speed as a rotor of the motor/generator.

9. The power supply system of claim 1, where the power source is a utility power grid.

10. The power supply system of claim 1, where the battery system and the flywheel system reside in a common housing.

11. A method, comprising:
    supplying AC power from a flywheel system, rectified, to a DC bus while a battery system is electrically coupled without a switching circuit to the DC bus concurrently with the flywheel system, the battery system and the flywheel system to receive power from a power source, the DC bus coupled to a load for supplying power to the load through the DC bus;
    supplying DC power from the battery system to the DC bus; and
    monitoring the flywheel system and the battery system with a common controller.

12. The method of claim 11, further comprising supplying AC power from the power source to the flywheel system to charge the flywheel system.

13. The method of claim 11, further comprising inverting the power from the DC bus into AC and supplying the AC power to the load.

14. The method of claim 11, where monitoring the battery system comprises monitoring at least one of battery voltage, temperature, current, and open circuit.

15. The method of claim 11, where monitoring the flywheel comprises monitoring at least one of rotational speed and voltage output.

16. The method of claim 11 where supplying power from a flywheel system to a DC bus comprises supplying power at a higher voltage than a voltage of the battery system, the higher voltage from the flywheel system decreasing to a voltage below the voltage of the battery system, and wherein the method further comprises supplying power at the voltage of the battery system in response to the higher voltage from the flywheel system decreasing to or below the voltage of the battery system.

17. A power supply system for providing backup power to a load powered by an AC power source, comprising:
    a flywheel system comprising a flywheel and a motor/generator electrically coupled to a DC bus to provide power to the DC bus, the flywheel configured to receive power from the AC power source, the DC bus for supplying electrical power to the load;
    a battery system electrically coupled without a switching circuit to the DC bus to supply power to the DC bus, the battery system configured to remain electrically coupled to the DC bus concurrently with the flywheel system while the flywheel system is providing power to the DC bus, and to supply power to the load through the DC bus in response to a voltage of the power supplied to the load by the flywheel system falling below a voltage at which the battery system is configured to supply power to the load; and
    a controller coupled to the flywheel system and the battery system, the controller configured to monitor the flywheel system and the battery system.

18. The power supply system of claim 17, where in monitoring the battery system, the controller is configured to monitor at least one of battery voltage, temperature, current, and open circuit.

19. The power supply system of claim 17, where in monitoring the flywheel system, the controller is configured to monitor at least one of rotational speed and voltage output.

20. The power supply system of claim 17 further comprising a housing enclosing the flywheel system and the battery system.

21. The power supply system of claim 17, where the flywheel system is configured to supply power to the DC bus at a higher voltage than a voltage of power supplied by the battery system to the DC bus.

* * * * *